Feb. 26, 1924.
C. G. KUEBLER
1,485,276
CUTTING MACHINE
Filed March 24, 1921 2 Sheets-Sheet 1
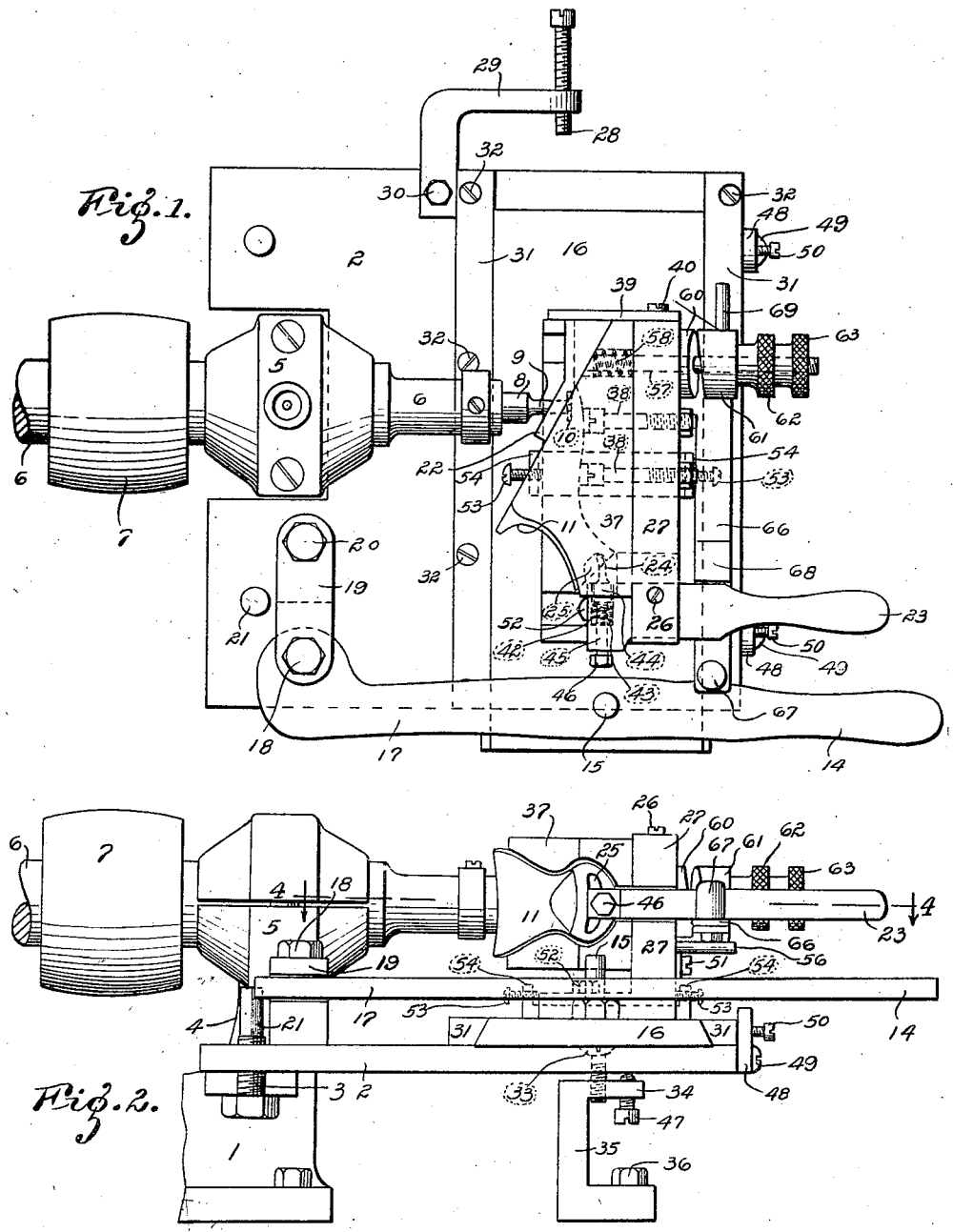

Feb. 26, 1924.

C. G. KUEBLER 1,485,276

CUTTING MACHINE

Filed March 24, 1921  2 Sheets-Sheet 2

Inventor:
C. G. Kuebler,
By Hugh H. Wagner,
Attorney.

UNITED STATES PATENT OFFICE.

CHRISTIAN G. KUEBLER, OF ST. LOUIS, MISSOURI, ASSIGNOR TO CINDERELLA HEEL CORPORATION, OF ST. LOUIS, MISSOURI, A CORPORATION OF MISSOURI.

CUTTING MACHINE.

Application filed March 24, 1921. Serial No. 455,070.

*To all whom it may concern:*

Be it known that I, CHRISTIAN G. KUEBLER, a citizen of the United States, residing at the city of St. Louis, in the State of Missouri, have invented certain new and useful Improvements in Cutting Machines, of which the following is a specification.

This invention is a machine for cutting slots, or grooves, in metal and is particularly adapted and intended for milling in the castings for aluminum shoeheels. It will be described more particularly in connection with such use, but is adaptable for various useful purposes.

Among the desiderata in such a machine are tightness, and positiveness, of the hold upon, and of, the material to be cut; positiveness and cleanness of the cut; flexibility and ease of adjustment for different sizes of objects to be cut, and size and angle of cut, and solidity and absence of vibration in the machine. These desirable points are present in this machine, and in action it possesses the important advantages that the work, or material, to be cut, can be very rapidly inserted in, and removed from, the workholder.

Figure 3:
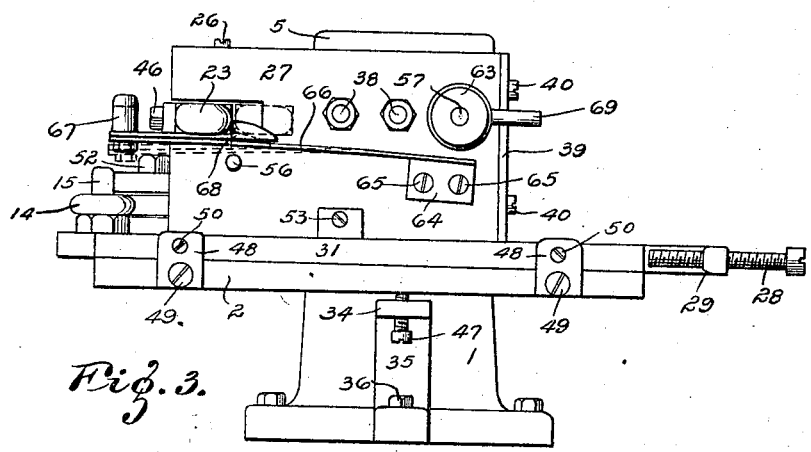
Figure 4:
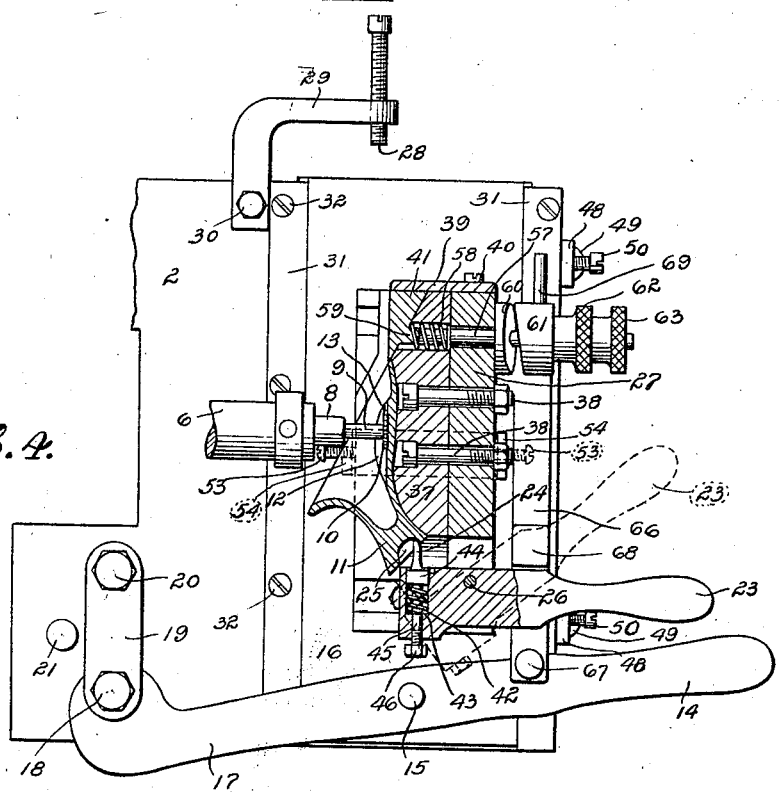

In the accompanying drawings forming parts of this specification, in which like numbers of reference denote like parts wherever they occur, Figure 1 is a top plan view;
Figure 2 is a front elevation;
Figure 3 is a side elevation; and
Figure 4 is a sectional view taken on the line 4—4 in Figure 2, located in the direction indicated by arrows.

The base 1 may be of any suitable size, or rest upon any suitable sub-base. The bedplate 2 is attached thereto by screw 3. Standard 4 rises from base 1 to support the bearing 5 for shaft, or spindle, 6 which is driven by pulley 7, or other suitable means. The diameter of shaft 6 is reduced at its end away from pulley 7, and at its said extremity it terminates in the chuck 8, adapted to receive the arbor 9 of the milling cutter 10, which cutter 10 may or may not, as desired, be provided with saw teeth.

At this point in the drawings, the said cutter 10 is shown operating upon an aluminum shoeheel 11, which heel is formed with a swelling 12, in which is to be cut the slot, or groove, 13.

The said slot 13 is cut in the heel 11 by the cutter 10 in the following manner: The operator grasps the handle 14, which is pivoted at 15, to the slidable plate 16. The operator pushes on handle 14, which causes slide 16 to travel away from the operator and thus to push the swell 12 in heel 11 against cutter 10, with the result that slot 13 is cut.

Handle 14 is part of lever 17, pivotally fulcrumed at 18, to link 19 pivoted at 20. A stop 21 limits the outward throw of handle 14.

Upon the said cutting operation it is necessary to insert the heel 11 in the workholder in such a manner that tongue 22 firmly abuts the top of the heel 11, and then the operator moves the lever 23 from the open position, shown in dotted lines in Figure 4, to the closed position shown in full lines in Figure 4 and also in Figure 1, in which closed position the finger 24 seats in a cavity 25 in the bottom of heel 11, and between the same and the tongue 22 the heel 11 is securely held so as to be immovable when the cutter 10 cuts slot 13 in an accurate and true and unwavering manner.

Lever 23 is pivoted at 26 within angleplate 27.

Slide 16 is limited in its motion in one direction by adjustable stop 28 borne by bracket 29 fastened by screw 30 to bedplate 2. The said slide 16 travels in guides 31, attached by screws 32 to bedplate 2.

Angleplate 27 is attached to slide 16 and travels therewith.

Screw 33 attaches bedplate 2 to an arm 34 of bracket 35, which is attached by screw 36 to the sub-base, or other support.

Block 37 is attached by screws 38 to angleplate 27 and has a hollowed-out part, forming a cradle, for the reception therein of heel 11, the contour of the said hollow being in resemblance to the contour of the heel 11, so as to allow it to rest in the firm support that does not mar its surface, because at the time of the operation performed by this machine, the heel casting has already been polished.

Tongue 22 is held in place by plate 39, attached by screw 40 to angleplate 27. Said tongue 22 may be formed integral with brace 41, which steadies same against plate 39.

Finger 24 is spring-pressed by spring 42, which bears against shoulder 43 and shoulder 44. Spring 42 encircles screw 45, whereby the tension of the said spring may be increased or diminished by turning nut 46.

Set screw 47 will adjust bedplate 2 up or down and together with the manipulation of the screw 33, it is readily adapted to adjust the level of the bed plate 2 so that the same may be perfectly horizontal.

Plate 48 is attached to bedplate 2 by screw 49, and serves to hold one of the guides 31 in place, and with it slide 16. The other guide 31 is secured to bedplate 2 with screws 32. The tension of guides 31 against slide 16 is tightened or diminished by the pressure of plate 48 thereagainst, under the impulsion of set-screw 50. It will be observed that the inner edges of guides 31 and the outer edge of slide 16 are oppositely beveled, so as to co-operate together, such beveling being in that direction which will prevent slide 16 from rising out of place.

Screws 53 passing through lugs 54, fixed to slide 16, permit the adjustment to right or left of anglemember 27 carrying block 37. The inner ends of screws 53 impinge against the said anglemember 27, and if it is desired to move the same to the left, the right-hand screw 53 will be turned inwardly, and if it is desired to move the same to the right, the left-hand screw 53 will be turned inwardly.

Notwithstanding the desirability of a tight clamp for heel 11, in the hollow of block 37, it is necessary to provide a certain degree of flexibility to such clamp, in order to accommodate unexpected conditions, such as variations in heat, friction, temper, expansion, or, hardness, and softness, of the metal. To this end tongue or tongues 22 should be mounted on a stem 57 and circled by a spring 58, which impinges against a shoulder 59 in block 37, and also against anglemember 27. Stem 57 passes loosely through a cam 60, fixed to anglemember 27. Against the said cam 60 another cam 61 is adapted to work the said second-mentioned cam 61 being loosely mounted on the said stem 57, and there being adjacent thereto and screwed upon the said stem 57 a nut 62 locked by nut 63, by means of which nut 62 and the co-operation of the opposite cam-faces 60 and 61 the tension of spring 58 can be tightened or reduced.

Plate 64 is attached by screws 65 to the side of anglemember 27, and there projects spring-arm 66 from plate 64, and handle 67 at one extremity of arm 66 enables the operator to lower the same for purpose of moving lever 23 to the open position, shown in dotted lines in Figure 4. When the said lever 23 is moved to the closed position, shown in full lines in Figures 1 and 4, spring-arm 66 naturally rises and the lock, or jaw, 68 holds lever 23 in locked position until the slot 13 has been cut in heel 11. The locked position of arm 66 is shown in full lines in Figure 3, and the open position in dotted lines in the same figure. The downward movement of arm 66 is limited by screw 56, which projects in its path. Handle 69 on cam 61 facilitates turning of the said cam to any desired position for adjusting purposes, in which position it can be locked by nuts 62 and 63.

Having thus described this invention, I hereby reserve the benefit of all changes in form, arrangement, order, or use of parts, as it is evident that many minor changes may be made therein without departing from the spirit of this invention or the scope of the following claims.

I claim:

1. In a machine of the character described, the combination of a bedplate, a guideway thereon, a slide, a cradle mounted on slide, workholding members mounted on said cradle, a cutter, and means for driving the said cutter, one of the said workholding members being adjustable and the other being yieldable.

2. In a machine of the character described, the combination of a bedplate, a guideway thereon, a slide, a cradle mounted on slide, workholding members mounted on said cradle, a cutter, and means for driving the said cutter, one of the said workholding members being adjustable, and the other member being yieldable, the adjustable member being composed of a block, a stem upon which the said block is mounted, a fixed cam and an adjustable cam on said stem, and means for forcing the cam-faces into juxta-position.

3. In a machine of the character described, the combination of a bedplate, a spindle, a cutter driven by the said spindle, a slide mounted on the said bedplate, and a cradle mounted on the said slide, workholding members mounted on said cradle, one of said members being adjustable and comprising a pivoted lever.

4. In a machine of the character described, the combination of a bedplate, a spindle, a cutter driven by the said spindle, a slide mounted on the said bedplate, a cradle mounted on the said slide, a relatively fixed workholding member and a movable workholding member mounted on said cradle, the said movable workholding member consisting of a pivoted lever, the said lever bearing a finger.

5. In a machine of the character described, the combination of a bedplate, a spindle, a cutter driven by the said spindle, a slide mounted on the said bedplate, a cradle mounted on the said slide, a relatively fixed workholding member and a movable workholding member mounted on said cradle, the said movable workholding member consisting of a pivoted lever, and means whereby accidental movement of said pivoted lever is prevented when said lever is in a closed position.

6. In a machine of the character described, the combination of a bedplate, a spindle, a cutter driven by the said spindle, a slide mounted on the said bedplate, a cradle mounted on the said slide, a relatively fixed workholding member and a movable workholding member mounted on said cradle, the said movable workholding member consisting of a pivoted lever, and means to lock said lever from accidental movement when said lever is in a closed position, the said means consisting of a spring-arm bearing a catch.

7. In a machine of the character described, the combination of a bedplate, a spindle, a cutter driven by the said spindle, a slide mounted on the said bedplate, a cradle mounted on the said slide, a relatively fixed workholding member and a movable workholding member mounted on said cradle, the said movable workholding member consisting of a pivoted lever provided with a spring-pressed finger.

8. In a machine of the character described, the combination of a bedplate, a spindle, a cutter driven by the said spindle, a slide mounted on the said bedplate, a cradle mounted on the said slide, a relatively fixed workholding member and a movable workholding member mounted on said cradle, the said movable workholding member consisting of a pivoted lever provided with a spring-pressed finger and means whereby said spring pressed finger may be adjusted.

9. In a machine of the character described, the combination of a bedplate, a slideway thereon, a slide adapted to be moved in the said slideway, a cutter, means for driving the said cutter, a cradle mounted on the said slide, workholding members also mounted on the said slide, and means for moving the said slide so as to bring work held in the said cradle into contact with the said cutter, there being an anglemember attached to the said slide, and a cradle attached to the said anglemember.

10. In a machine of the character described, the combination of a bedplate, a slideway thereon, a slide adapted to be moved in the said slideway, a cutter, means for driving the said cutter, a cradle mounted on the said slide, workholding members also mounted on the said slide, and means for moving the said slide so as to bring work held in the said cradle into contact with the said cutter, said cradle being laterally adjustable.

11. In a machine of the character described, the combination of a bedplate, a slideway thereon, a slide adapted to be moved in the said slideway, a cutter, means for driving the said cutter, a cradle mounted on the said slide, workholding members also mounted on the said slide, and means for moving the said slide so as to bring work held in the said cradle into contact with the said cutter, said cradle being laterally adjustable by means of screws.

In testimony whereof I hereunto affix my signature.

CHRISTIAN G. KUEBLER.